United States Patent
Chi et al.

(10) Patent No.: US 10,025,393 B2
(45) Date of Patent: Jul. 17, 2018

(54) BUTTON OPERATION PROCESSING METHOD IN SINGLE-HAND MODE

(71) Applicant: Xiaomi Inc., Beijing (CN)

(72) Inventors: Yubo Chi, Beijing (CN); Fangyu Hu, Beijing (CN); Lina Xu, Beijing (CN)

(73) Assignee: XIAOMI INC., Haidian District, Beijing (CN)

(*) Notice: Subject to any disclaimer, the term of this patent is extended or adjusted under 35 U.S.C. 154(b) by 0 days.

(21) Appl. No.: 15/163,698

(22) Filed: May 25, 2016

(65) Prior Publication Data

US 2016/0349856 A1 Dec. 1, 2016

(30) Foreign Application Priority Data

May 29, 2015 (CN) .......................... 2015 1 0290025

(51) Int. Cl.
*G06F 3/023* (2006.01)
*G06F 3/0488* (2013.01)
*H04M 1/725* (2006.01)
*G06F 3/0481* (2013.01)
(Continued)

(52) U.S. Cl.
CPC .......... *G06F 3/0238* (2013.01); *G06F 3/0488* (2013.01); *G06F 3/04817* (2013.01); *G06F 3/04883* (2013.01); *H04M 1/72569* (2013.01); *G06F 2203/04806* (2013.01); *H04M 1/0281* (2013.01); *H04W 88/02* (2013.01)

(58) Field of Classification Search
CPC ... G06F 3/0238; G06F 3/0488; H04M 1/0281
USPC .................. 345/169; 715/700–866
See application file for complete search history.

(56) References Cited

U.S. PATENT DOCUMENTS

2010/0134423 A1 6/2010 Brisebois et al.
2015/0084885 A1* 3/2015 Kawamoto ........... G06F 3/0482
345/173

FOREIGN PATENT DOCUMENTS

CN 103218165 A 7/2013
CN 103914258 A 7/2014
CN 103927166 A 7/2014
(Continued)

OTHER PUBLICATIONS

Dallas Thomas, "How to Swap the Back & Recents Keys on Your Samsung Galaxy S6",, Apr. 25, 2015, Retrieved from the Internet: URL: http://gs6.wonderhowto.com/how-to/swap-back-recents-keys-your-samsung-galaxy-s6-0161529/.
Anonymous, "swap back home key gesture android—Google Search", Apr. 25, 2015, Retrieved from the Internet: URL: https://www.google.de/#q=swap+back+home+key+gesture+android.
Extended European Search Report of EP 16171544.
"International Search Report for PCT/CN2015/095140".
(Continued)

*Primary Examiner* — Michael Pervan
(74) *Attorney, Agent, or Firm* — Jun He Law Offices P.C.; James J. Zhu

(57) ABSTRACT

A button operation processing method for a terminal device in a single-hand mode and the terminal device are provided. The method includes: detecting whether a terminal device is switched to the single-hand mode; detecting whether a first preset operation on a proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button outside the single-hand operation area on the terminal device.

11 Claims, 10 Drawing Sheets

(51) Int. Cl.
  *H04M 1/02* (2006.01)
  *H04W 88/02* (2009.01)

(56) References Cited

FOREIGN PATENT DOCUMENTS

| | | |
|---|---|---|
| CN | 104185835 A | 12/2014 |
| CN | 104461255 A | 3/2015 |
| CN | 104866199 A | 8/2015 |
| EP | 2835728 A1 | 2/2015 |
| JP | 2013218428 A | 10/2013 |
| JP | 2014153956 A | 8/2014 |
| KR | 20140138310 A | 12/2014 |
| RU | 2454701 C2 | 6/2012 |

OTHER PUBLICATIONS

Dallas Thomas, "How to Swap the Back & Recents Keys on Your Samsung Galaxy S6", Apr. 28, 2015, URL: https://gs.gadgethacks.com/how-to/swap-back-recents-keys-your-samsung-galaxy-s6-0161529/.
Office Action for EP Application No. 16171544.6 dated Nov. 9, 2017
Thomas Dallas, "How to Swap the Back & Recent Keys on Your Samsung Galaxy S6", Apr. 27, 2015, Retrieved from the Internet: URL: https://gs6.gadgethacks.com/how-to/swap-back-recents-keys-your-samsung-galaxy-s6-0161529/ (retrieved on Oct. 27, 2017).

\* cited by examiner

BUTTON OPERATION PROCESSING METHOD IN SINGLE-HAND MODE

CROSS-REFERENCE TO RELATED APPLICATIONS

This application is based upon and claims priority to Chinese Patent Application 201510290025.4, filed on May 29, 2015, the entire contents of which are incorporated herein by reference.

TECHNICAL FIELD

The present disclosure relates to the art of terminal device device, and more particularly, to a button operation processing method in a single-hand mode implemented by an electronic device and the electronic device thereof.

BACKGROUND

With increased demands for user's visibility, the screen of a terminal device becomes larger and larger. As a result, it is difficult for the user to hold and operate the terminal device with a single hand. Usually, both hands are required for holding and operating the terminal device, which is inconvenient for the user. In order to improve user experience, a "single-hand mode" is proposed in the related art. For example, the display interface may be located within the user's single hand operation area by being zoomed in or zoomed out, thereby allowing the user to hold and operate a large screen terminal device with a single hand.

SUMMARY

According to a first aspect of embodiments of the present disclosure, there is provided a button operation processing method which is implemented by a terminal device in a single-hand mode. The method includes: detecting whether the terminal device is switched to the single-hand mode; detecting whether a first preset operation on a proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button outside the single-hand operation area on the terminal device.

According to a second aspect of embodiments of the present disclosure, there is provided a terminal device including: a processor; and a memory for storing instructions executable by the processor. The processor is configured to perform: detecting whether the terminal device is switched to a single-hand mode; detecting whether a first preset operation on a proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button without the single-hand operation area on the terminal device.

According to a third aspect of embodiments of the present disclosure, there is provided a non-transitory computer-readable storage medium having stored therein instructions that, when executed by a processor of a terminal device in a single-hand mode, causes the terminal device to perform a method for button operation processing method. The method includes: detecting whether the terminal device is switched to the single-hand mode; detecting whether a first preset operation on a proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button outside the single-hand operation area on the terminal device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
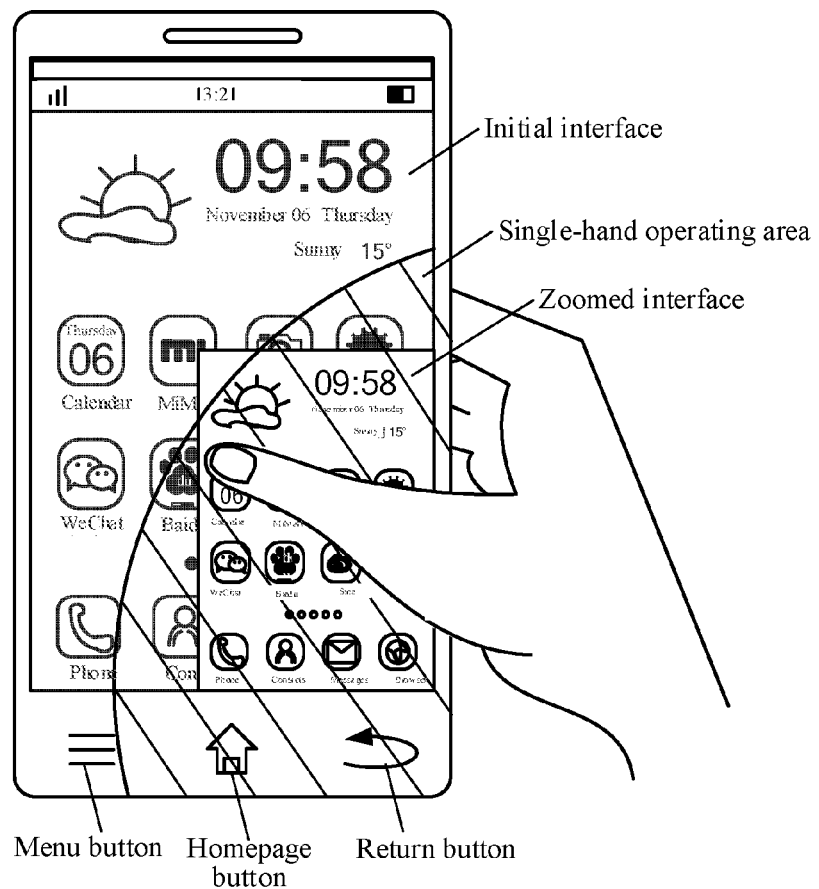
FIG. 1 is a schematic diagram illustrating a terminal device interface in a single-hand mode according to an exemplary embodiment.

FIG. 1 is a schematic diagram illustrating a terminal device interface in a single-hand mode according to an exemplary embodiment. As illustrated in FIG. 1, when a user activates the single-hand mode, a zoomed interface corresponding to the initial interface (e.g., the graphical user interface GUI) of the terminal device may be obtained with a preset scale, and the zoomed interface is displayed at the portion of the terminal device which is held by the user. For example, as illustrated in FIG. 1, the user holds the terminal device using the right hand and the terminal device is in a vertical state, and the portion of the terminal device held by the user is a lower right corner of the terminal device. Accordingly, the zoomed interface is displayed at the portion of the terminal device which is held by the user, i.e. within the single-hand operation area of the user. Thus, the user can operate the terminal device using, for example, the right thumb while holding the terminal device.

Meanwhile, in addition to covering the zoomed interface, the single-hand operation area further covers part of the physical buttons on the terminal device, such as the "Home Page" button and the "Return" button positioned at the center and right side of the lower portion of the terminal device, respectively. However, the "Menu" button positioned at the left side of the lower portion of the terminal device is positioned outside the single-hand operation area, such that the user cannot operate said physical button using a single hand. Therefore, the practicality of the "single-hand mode" is limited since the single-hand mode merely adjusts the displayed content on the screen without performing any effective corresponding process on the physical buttons on the terminal device.

Therefore, the present disclosure provides a scheme for a button operation processing in a single-hand mode, so that the practicality of the "single-hand mode" can be improved by adjusting the operation of physical buttons.

Figure 2:
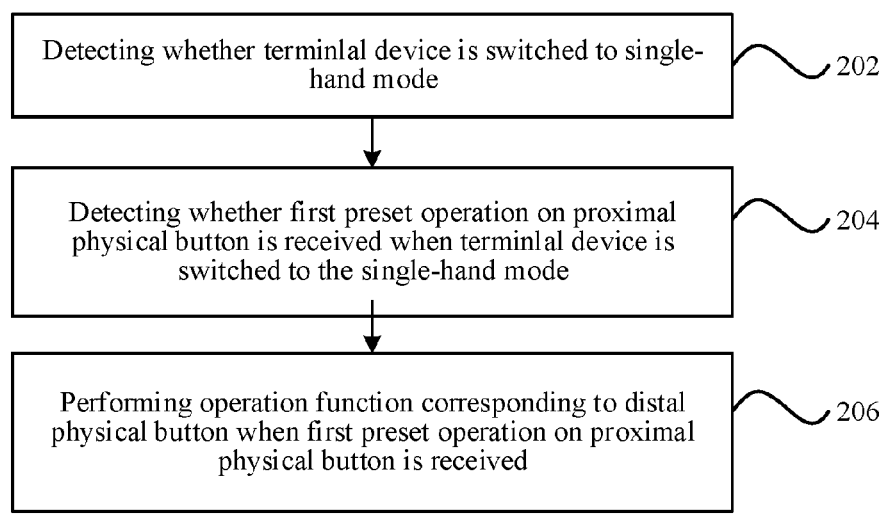
FIG. 2 is a flow chart illustrating a button operation processing method in a single-hand mode according to an exemplary embodiment.

FIG. 2 is a flow chart illustrating a button operation processing method in a single-hand mode according to an exemplary embodiment. As illustrated in FIG. 2, the method can be applied in a terminal device, and may include following steps.

In step 202, it is detected that whether the terminal device is switched to the single-hand mode.

In the present embodiment, the switch of the single-hand mode of the terminal device may be achieved by detecting a triggering operation on a virtual button on the screen or a physical button on the user's terminal device, or by automatically detecting the way in which the user holds and operates the terminal device. Herein, in the single-hand mode, the user may hold and operate the terminal device with a single hand. For example, the user can use the thumb of the holding hand to achieve the adjustment on the display interface (e.g., zooming in and zooming out of the display interface) within a corresponding single-hand operation area, and to effectively operate on the entire display interface of the terminal device.

Of course, those skilled in the art may switch the terminal device to the single-hand mode by other means, and various adjustments of the display interface are possible in the single-hand mode. All these means are applicable in the technical solution of the present disclosure, which is not limited by the present disclosure.

In step 204, when the terminal device is switched to the single-hand mode, it is to be detected whether a first preset operation on the proximal physical button is received, wherein the proximal physical button is a physical button within a single-hand operation area on the terminal device.

In the present embodiment, the terminal device may determine which hand is performing operations in the corresponding single-hand operation mode, and select, among a plurality of physical buttons horizontally arranged on the terminal device, a physical button distal from the hand for performing operations as the distal physical button, and the remaining physical buttons as the proximal physical buttons.

The hand for performing operations is determined (e.g., by automatic detection or user settings), and operation means of the physical buttons may be precisely configured, thereby avoiding confusion.

As an exemplary implementation, for example, for a terminal device including three physical buttons arranged horizontally thereon, if the hand for performing operations corresponds to left hand, the left and center physical buttons are the proximal physical buttons, and the right physical button is the distal physical button. If the hand for performing operations corresponds to right hand, the right and center physical buttons are the proximal physical buttons, and the left physical button is the distal physical button.

In step 206, when a first preset operation on the proximal physical button is received, an operation function corresponding to the distal physical button is performed, wherein the distal physical button is a physical button outside the single-hand operation area of the terminal device.

In the present embodiment, one proximal physical button may simulate the distal physical button, while another proximal physical button may simulate the one proximal physical button, thereby preventing one physical button from simultaneously performing functions of the proximal physical button and the distal physical button, which may improve user experience.

As can be seen from the above embodiments, the physical buttons on the terminal device are classified into proximal physical buttons and distal physical buttons, and the distal physical button may be functionally simulated by the proximal physical button. Accordingly, a user may perform functions of all the physical buttons by operating only the proximal physical buttons. Therefore, physical buttons are also available in the single-hand mode, thereby improving practicality of the single-hand mode.

Hereinafter, referring to the drawings, the processes in steps 204 and 206 are further described.

I. Classification of Physical Buttons

On one hand, information of the physical buttons on the terminal device for single-hand mode is required, such as the position, number and arrangement of the physical buttons. For example, as illustrated in FIG. 3, provided that the physical buttons are three physical buttons arranged in a row at the lower side of the terminal device, when the user holds the terminal device vertically (i.e., the position as shown in FIG. 3), such situation may exist that his/her own single-hand operation cannot cover all the physical buttons.

On the other hand, a direction of the operating hand of the user on the terminal device is required. For example, when the hand for performing operations corresponds to left hand, the physical button on the right side of the terminal device is determined as the distal physical button, i.e., the rightmost one of the plurality of physical buttons arranged horizontally on the terminal device. When the hand for performing operations corresponds to right hand, the physical button on the left side of the terminal device is determined as the distal physical button, i.e., the leftmost one of the plurality of physical buttons arranged horizontally on the terminal device. For example, when the user holds the terminal device with right hand as shown in FIG. 3, a corresponding single-hand operation area may only cover the physical button in the center and the right side and cannot cover the left physical button. Accordingly, the center and rightmost physical buttons may be set as the proximal physical buttons, and the left most physical button may be set as the distal physical button.

II. Simulation of Button Function

Figure 3:
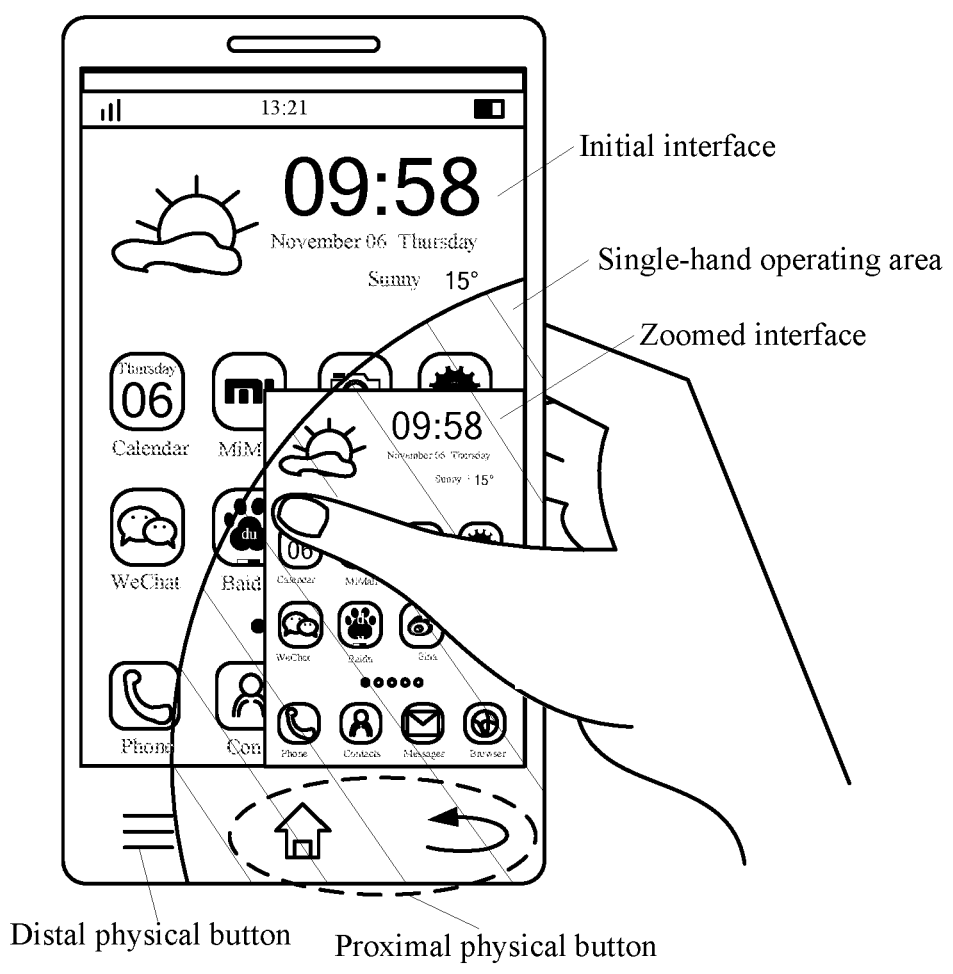
FIG. 3 is a schematic diagram illustrating a button operation in a single-hand mode according to an exemplary embodiment.
Figure 4A:
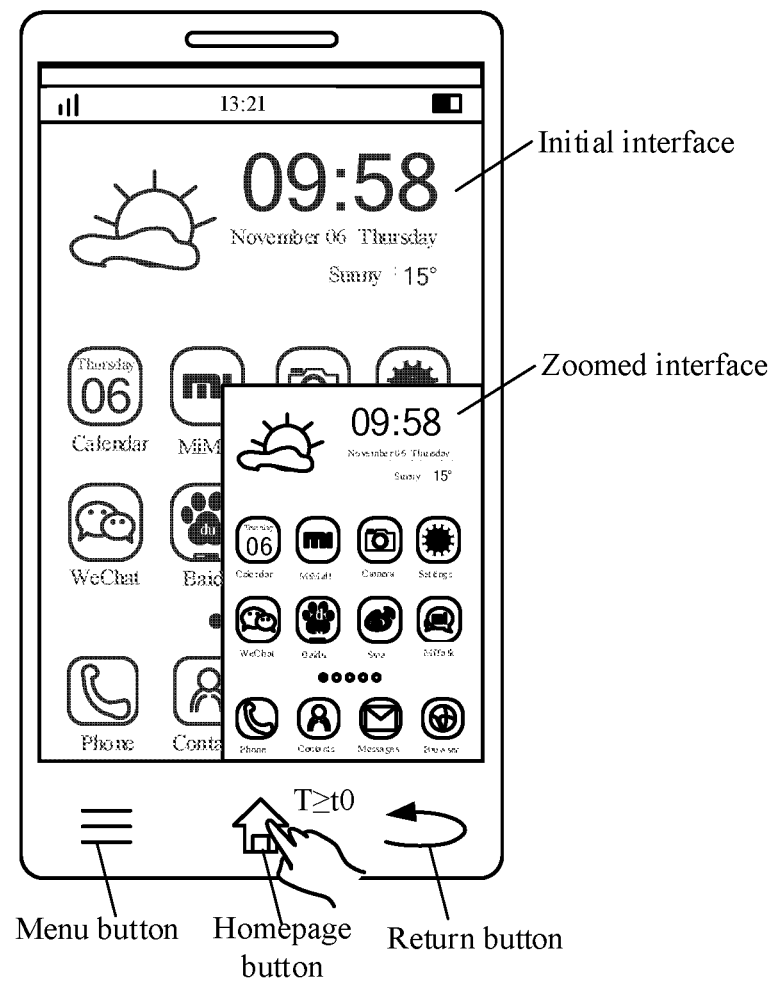
FIGS. 4A and 4B are schematic diagrams illustrating a button operation in a single-hand mode according to an exemplary embodiment.
Figure 4B:
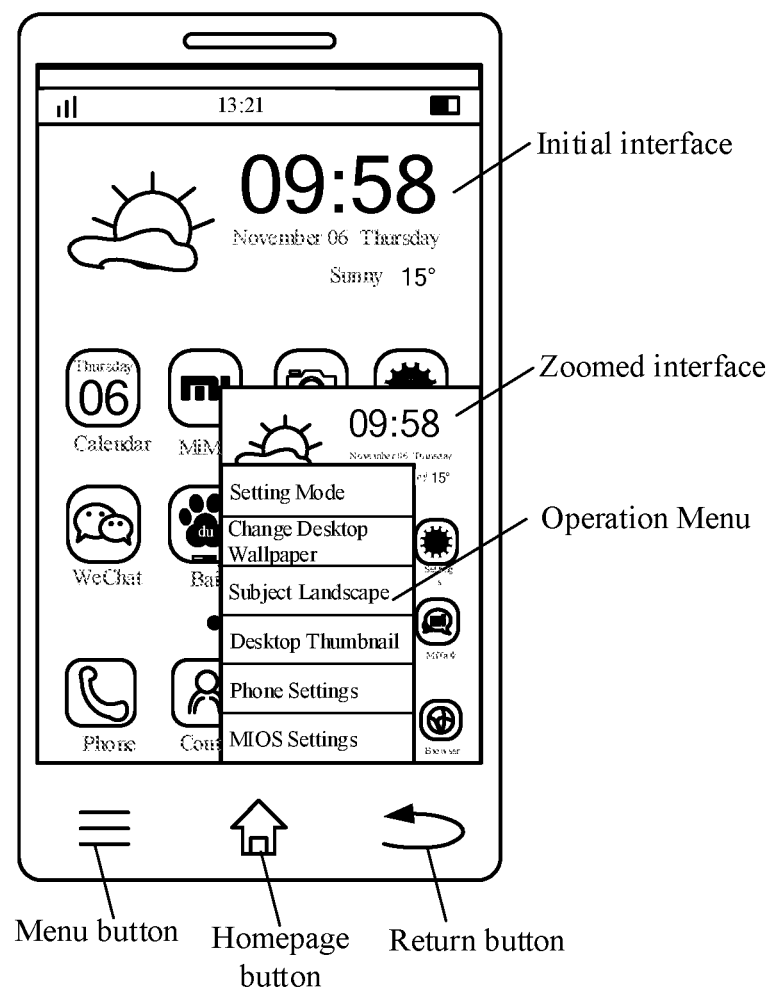

Based on the embodiment illustrated in FIG. 3, the left physical button function may be simulated by the center or right physical button. As an example of simulating the left physical button function by the center physical button, as illustrated in FIG. 4A, when the user performs a first preset operation on the center homepage button, such as a long press operation with a press time T no shorter than a preset time t0, the terminal device performs an operation function corresponding to the menu button. For example, as illustrated in FIG. 4B, an operating menu is brought up to the display interface.

As an exemplary implementation, the operation function corresponding to the distal physical button is performed when the first preset operation on any of the proximal physical buttons is received; and a corresponding initial operation function is performed when an initial triggering operation on each of the proximal physical buttons is received.

In other worlds, in the case where the proximal physical button can simulate the function of distal physical button, the proximal physical button can also perform its original operation function. For example, as illustrated in FIG. 4A, the user may perform the operation function of the menu button using the homepage button by a first preset operation such as long press; alternatively, the original operation function, such as jumping directly to the preset home page, of the homepage button may still be performed when the user performs the initial triggering operation, such as a click operation, on the homepage button.

In this embodiment, it is unnecessary to change the operation function of the proximal physical button while simulating the function of distal physical button, and the user is only required to know how to simulate the function of distal physical button, thereby lowering study cost for the user.

In another exemplary implementation, the operation function corresponding to the distal physical button is performed when the first preset operation on any of the proximal physical buttons is received; a corresponding original operation function is performed when an initial triggering operation on the other proximal physical button is received; and an operation function corresponding to the any of the proximal physical buttons is performed when a second preset operation on the other proximal physical button is received. In one embodiment, for example, "other proximal physical button" and "the any of the proximal physical buttons" may be the same physical button.

In other words, if there is a plurality of proximal physical buttons on the terminal device, one proximal physical button may be devoted to simulate the function of distal physical button, while other proximal physical buttons are used to simulate the operation function of the one proximal physical button. For example, as illustrated in FIG. 4A, both of the homepage button and the return button are proximal physical buttons while the menu button is a distal physical button. A proximal physical button relatively distal from the hand for performing operations is selected to simulate the function of distal physical button, that is, the homepage button is used to simulate the menu button, while the return button is used to simulate the operation function of the homepage button and to perform its original operation function.

In this embodiment, the independent simulation of distal physical button and the adjustment on the operation of the proximal physical buttons allow the relative concept and operation mode of "distal" and "proximal" to be remained between the proximal physical buttons. Therefore, the user may not be confused with different operation modes, and the user experience can thus be improved.

Of course, the above operation modes are merely examples of the technical solutions of the present disclosure. By setting the function of each proximal physical buttons, operation functions of any distal or proximal physical button may be simulated by each proximal physical button, thereby satisfying operation requirements in various situations, which are all included in the technical solutions of the present disclosure.

Figure 5A:
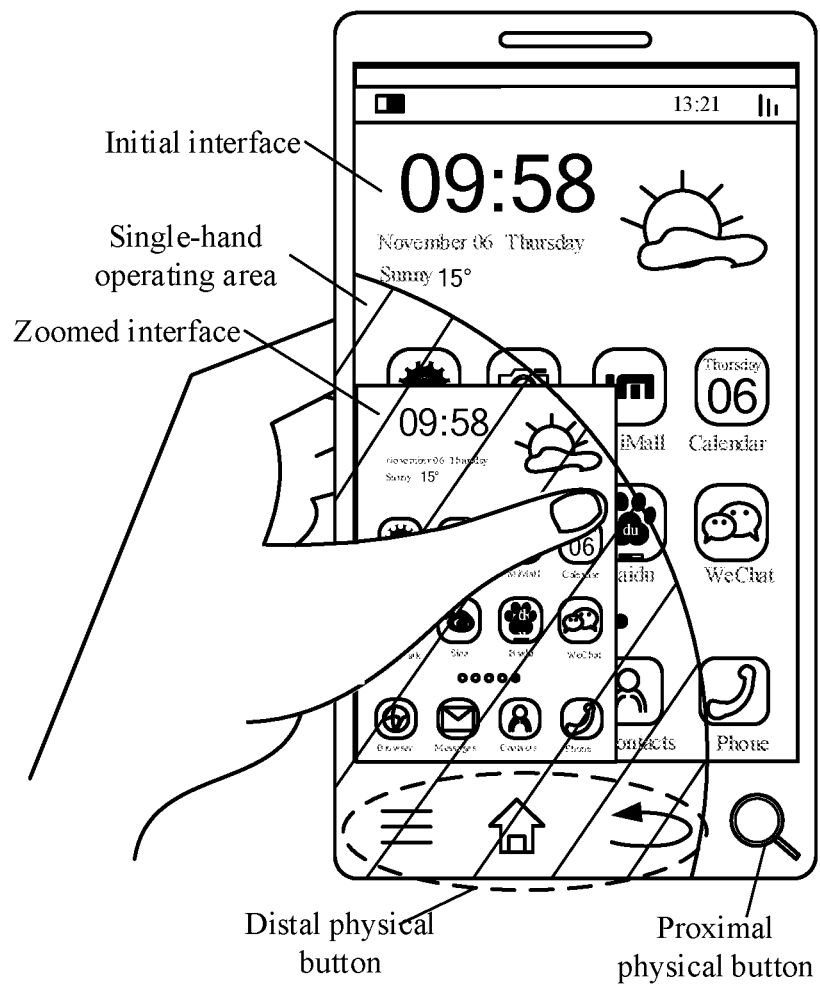
FIGS. 5A and 5B are schematic diagrams illustrating a button operation in a single-hand mode according to an exemplary embodiment.
Figure 5B:
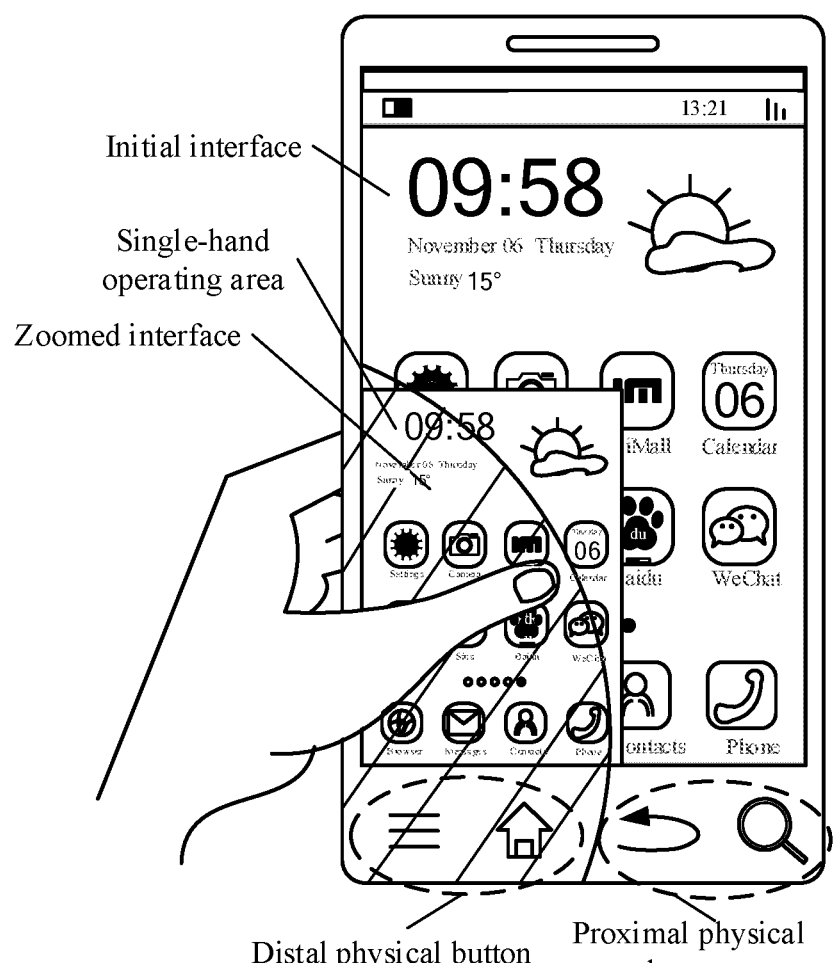

The following items shall be noted.

i) Button number. In the above embodiments illustrated in FIGS. 3, and 4A-4B, examples in which three physical buttons are arranged in one row at the lower side of the terminal device are described, however, the number of the physical buttons constructing the above "distal" and "proximal" relation is not limited by the present disclosure. The terminal device may include other number of physical buttons, for example, as illustrated in FIGS. 5A-5B, four physical buttons are included on the terminal device.

ii) Hand for performing operations. In the above embodiments illustrated in FIGS. 3, and 4A-4B, examples that the hand which is performing operations is right hand are described; however, hand for performing operations is not limited by the present disclosure. For example, as illustrated in FIG. 5A, the user may hold the terminal device with a single left hand, and based on the four physical buttons on the terminal device, three physical buttons on the left side may be used as the proximal physical buttons, and the right most physical button may be used as the distal physical button.

iii) Number of the distal physical button. In the above embodiments illustrated in FIGS. 3, 4A-4B and 5A, examples having a plurality of proximal physical buttons and one distal physical button are described; however, the number of the proximal physical button or the distal physical button is not limited by the present disclosure. For example, in the embodiment illustrated in FIG. 5B, the terminal device includes four physical buttons. When the user holds the terminal device with left hand, two physical buttons at the left side are proximal physical buttons, and two physical buttons at the right side are distal physical buttons. For illustration purposes, provided that the leftmost button is a left button 1, the second leftmost button is a left button 2, the rightmost button is a right button 1, and the second rightmost button is a right button 2.

As an exemplary embodiment, the terminal device may perform the operation function corresponding to the right button 2 when the first preset operation of the user on the left button 1 is detected, and perform the operation function corresponding to the right button 1 when the first preset operation of the user on the left button 2 is detected. Similarly, in another exemplary embodiment, the terminal device may perform the operation function corresponding to the right button 1 when the first preset operation of the user on the left button 1 is detected, and perform the operation function corresponding to the right button 2 when the first preset operation of the user on the left button 2 is detected. Herein, various correspondences among the left button 1, the left button 2, the right button 1 and the right button 2 may be preset. Alternatively, the correspondences may be set freely by the user according to own habits/preferences. The present disclosure is not limited thereby.

In addition, in the above embodiments, if the terminal device detects a triggering operation on the distal physical button, it may indicate that the user may cover all the physical buttons, and the terminal device quits the single-hand mode accordingly.

Corresponding to the embodiments of the button operation processing method in a single-hand mode, the present disclosure further provides embodiments of apparatus for a button operation processing in a single-hand mode.

Figure 6:
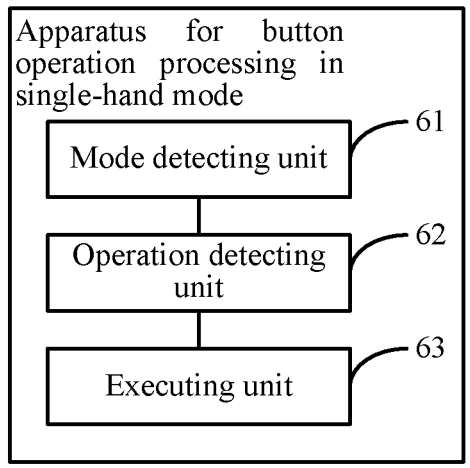
FIGS. 6 to 10 are block diagrams illustrating an apparatus for button operation processing in a single-hand mode according to an exemplary embodiment.

FIG. 6 is a block diagram illustrating an apparatus for a button operation processing in a single-hand mode according to an exemplary embodiment. Referring to FIG. 6, the apparatus includes a mode detecting unit 61, an operation detecting unit and an executing unit 63.

Herein, the mode detecting unit 61 is configured to detect whether the terminal device is switched to the single-hand mode.

The operation detecting unit 62 is configured to detect whether a first preset operation on the proximal physical button is received when the terminal device is switched to the single-hand mode, wherein the proximal physical button is a physical button within a single-hand operation area on the terminal device.

The executing unit 63 is configured to perform an operation function corresponding to a distal physical button when the first preset operation on the proximal physical button is received, wherein the distal physical button is a physical button outside the single-hand operation area on the terminal device.

Figure 7:
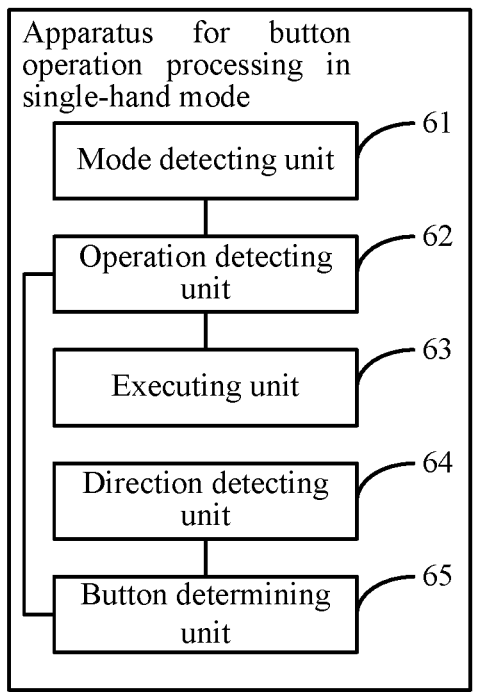

As illustrated in FIG. 7, which is a block diagram illustrating another apparatus for a button operation processing in a single-hand mode according to an exemplary embodiment. On the basis of the above embodiment illustrated in FIG. 6, the apparatus may further include a direction detecting unit 64 and a button determining unit 65.

Herein, the direction detecting unit 64 is configured to detect which hand is performing operations corresponding to the single-hand operation mode.

The button determining unit 65 is configured to determine the distal physical button as a physical button on the right side of the terminal device when the hand for performing operations corresponds to left hand, and to determine the distal physical button as a physical button on the left side of the terminal device when the hand for performing operations corresponds to right hand.

Figure 8:
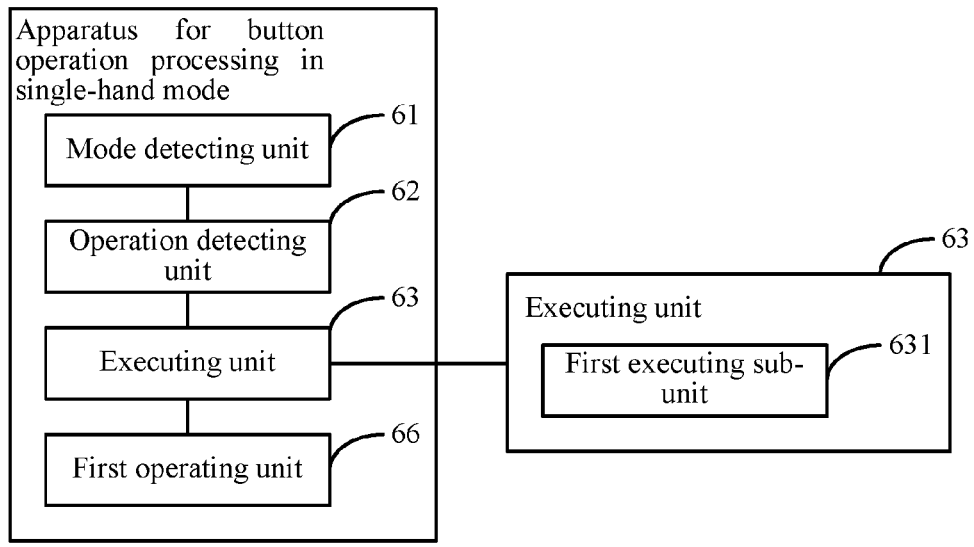

As illustrated in FIG. 8, which is a block diagram illustrating another apparatus for a button operation processing in a single-hand mode according to an exemplary embodiment. On the basis of the above embodiment illustrated in FIG. 6, the executing unit 63 includes: a first executing sub-unit 631 that is configured to perform the operation function corresponding to the distal physical button when the first preset operation on any of a plurality of proximal physical buttons is received.

The apparatus further includes a first operating unit 66 that is configured to perform a corresponding original operation function when an initial trigging operation on each of the plurality of proximal physical buttons is received.

Figure 9:
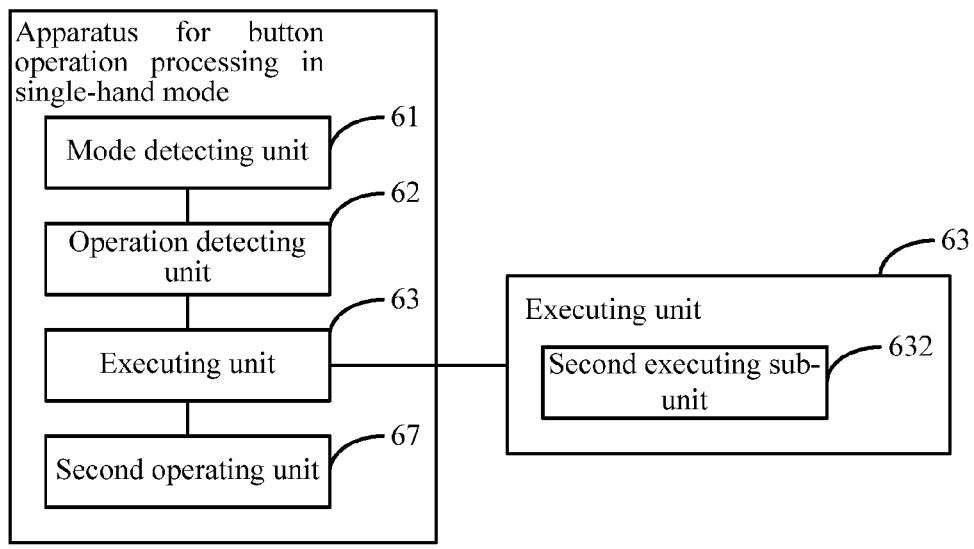

As illustrated in FIG. 9, which is a block diagram illustrating another apparatus for a button operation processing in a single-hand mode according to an exemplary embodiment. On the basis of the above embodiment illustrated in FIG. 6, the executing unit 63 includes: a second executing sub-unit 632 that is configured to perform the operation function corresponding to the distal physical button when the first preset operation on any of a plurality of proximal physical buttons is received.

The apparatus further includes a second operating unit 67 that is configured to perform an operation function corresponding to the any of the plurality of proximal physical buttons when a second preset operation on another proximal physical button is received.

Figure 10:
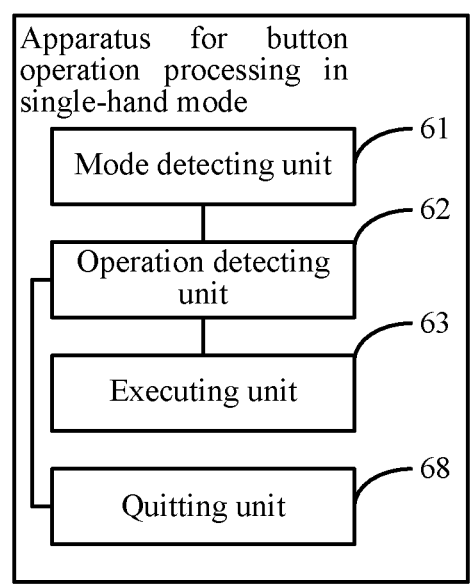

As illustrated in FIG. 10, which is a block diagram illustrating another apparatus for a button operation processing in a single-hand mode according to an exemplary embodiment. On the basis of the above embodiment illustrated in FIG. 6, the apparatus may further include a quitting unit 68.

Herein, the quitting unit is configured to quit the single-hand mode when a triggering operation on the distal physical button is detected.

It should be noted that the structure of the quitting unit 66 in the apparatus embodiment illustrated in FIG. 10 may be included in the above apparatus embodiments of FIGS. 7-9, which is not limited by the present disclosure.

With respect to the apparatus in the above embodiments, the specific manners for performing operations for individual modules therein have been described in detail in the embodiments regarding the methods, which will not be elaborated herein.

For device embodiments, since the device embodiments are substantially corresponding to the method embodiments, the relevant contents may be referred to some explanations in the method embodiments. The units illustrated as separate components may be or may not be separated physically, the component used as a unit display may be or may not be a physical unit, i.e., may be located at one location, or may be distributed into multiple network elements. A part or all of the modules may be selected to achieve the purpose of the solution in the present disclosure based on actual requirements. The person skilled in the art can understand and implement the present disclosure without paying inventive effort.

Correspondingly, the present disclosure also provides an apparatus for a button operation processing in a single-hand mode, which includes a processor and a memory for storing instructions executable by the processor. Herein, the processor is configured to perform: detecting whether the terminal device is switched to a single-hand mode; detecting whether a first preset operation on the proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button without the single-hand operation area on the terminal device.

Correspondingly, the present disclosure also provides a terminal device including a memory and one or more programs stored in the memory, and it is configured to execute the one or more programs by one or more processors for performing the follow operations: detecting whether the terminal device is switched to a single-hand mode; detecting whether a first preset operation on the proximal physical button is received when the terminal device is switched to the single-hand mode, the proximal physical button being a physical button within a single-hand operation area on the terminal device; and performing an operation function corresponding to a distal physical button when the first preset operation on the proximal physical button is received, the distal physical button being a physical button without the single-hand operation area on the terminal device.

Figure 11:
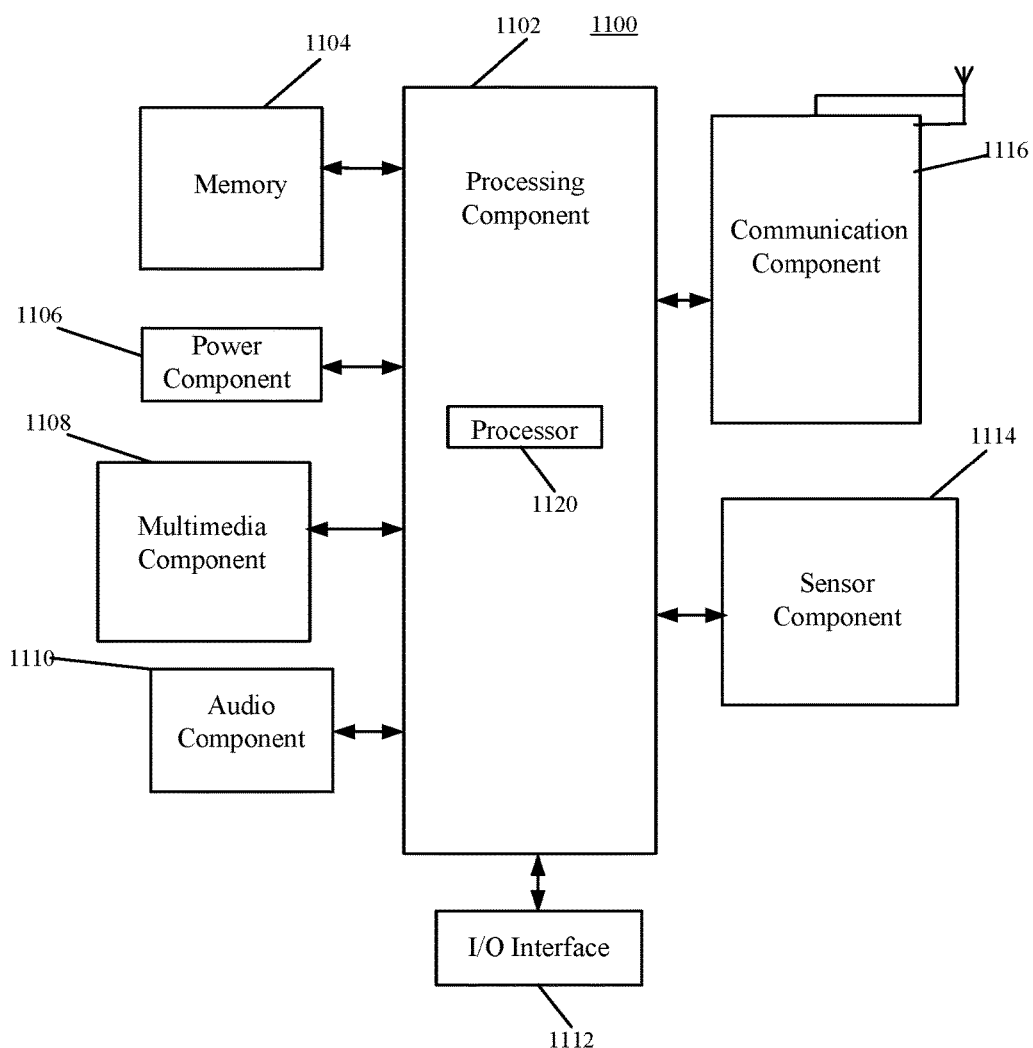
FIG. 11 is a structural diagram illustrating an apparatus for button operation processing in a single-hand mode according to an exemplary embodiment.

FIG. 11 is a structural diagram illustrating an apparatus for button operation processing in a single-hand mode 1100 according to an exemplary embodiment. For example, the device 1100 may be a mobile phone, a computer, a digital broadcast terminal device, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G or 3G or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A button operation processing method which is implemented by a terminal device in a single-hand mode, comprising:
   detecting whether the terminal device is switched to the single-hand mode;
   detecting whether a first preset operation on a proximal physical button is received when the terminal device is switched to the single-hand mode, the proximal physical button being a physical button within a single-hand operation area on the terminal device;
   performing an operation function corresponding to a distal physical button when the first preset operation on the proximal physical button is received, the distal physical button being a physical button outside the single-hand operation area on the terminal device; and
   performing an initial operation function of the proximal physical button when an initial trigging operation on the proximal physical button is received.

2. The method according to claim 1, further comprising:
   detecting which hand is performing operations corresponding to the single-hand operation mode,
   determining the distal physical button as a physical button on the right side of the terminal device when the hand for performing operations corresponds to left hand; and
   determining the distal physical button as a physical button on the left side of the terminal device when the hand for performing operations corresponds to right hand.

3. The method according to claim 2, wherein the performing an operation function corresponding to a distal physical button when the first preset operation on the proximal physical button is received comprises:
   performing the operation function corresponding to the distal physical button when the first preset operation on anyone of a plurality of proximal physical buttons is received.

4. The method according to claim 2, wherein the performing an operation function corresponding to a distal physical button when the first preset operation on the proximal physical button is received comprises: performing the operation function corresponding to the distal physical button when the first preset operation on anyone of a plurality of proximal physical buttons is received; and
   wherein the method further comprises: performing an operation function corresponding to anyone of the plurality of proximal physical buttons when a second preset operation on another proximal physical button is received.

5. The method according to claim 1, further comprising:
   quitting the single-hand mode when a triggering operation on the distal physical button is detected.

6. A terminal device, comprising:
   a processor; and
   a memory for storing instructions executable by the processor,
   wherein the processor is configured to perform:
   detecting whether the terminal device is switched to a single-hand mode;
   detecting whether a first preset operation on a proximal physical button is received when the terminal device is switched to the single-hand mode, the proximal physical button being a physical button within a single-hand operation area on the terminal device;
   performing an operation function corresponding to a distal physical button when the first preset operation on the proximal physical button is received, the distal physical button being a physical button without the single-hand operation area on the terminal device; and
   performing an initial operation function of the proximal physical button when an initial trigging operation on the proximal physical button is received.

7. The terminal device according to claim 5, wherein the processor is further configured to perform:
   detecting which hand is performing operations corresponding to the single-hand operation mode;
   determining the distal physical button as a physical button on the right side of the terminal device when the hand for performing operations corresponds to left hand; and
   determining the distal physical button as a physical button on the left side of the terminal device when the hand for performing operations corresponds to right hand.

8. The terminal device according to claim 7, wherein the performing an operation function corresponding to a distal physical button when the first preset operation on the proximal physical button is received comprises:
   performing the operation function corresponding to the distal physical button when the first preset operation on anyone of a plurality of proximal physical buttons is received.

9. The terminal device according to claim 7, wherein the performing an operation function corresponding to a distal physical button when the first preset operation on the proximal physical button is received comprises: performing the operation function corresponding to the distal physical button when the first preset operation on anyone of a plurality of proximal physical buttons is received; and
   wherein the processor is further configured to perform:
   performing an operation function corresponding to the anyone of the plurality of proximal physical buttons when a second preset operation on another proximal physical button is received.

10. The terminal device according to claim 5, wherein the processor is further configured to perform:
    quitting the single-hand mode when a triggering operation on the distal physical button is detected.

11. A non-transitory computer-readable storage medium having stored therein instructions that, when executed by a processor of a terminal device in a single-hand mode, causes the terminal device to perform a button operation processing method, the method comprising:
    detecting whether the terminal device is switched to the single-hand mode;
    detecting whether a first preset operation on a proximal physical button is received when the terminal device is switched to the single-hand mode, the proximal physical button being a physical button within a single-hand operation area on the terminal device;
    performing an operation function corresponding to a distal physical button when the first preset operation on the proximal physical button is received, the distal physical button being a physical button outside the single-hand operation area on the terminal device; and performing an initial operation function of the proximal physical button when an initial trigging operation on the proximal physical button is received.

\* \* \* \* \*